UNITED STATES PATENT OFFICE.

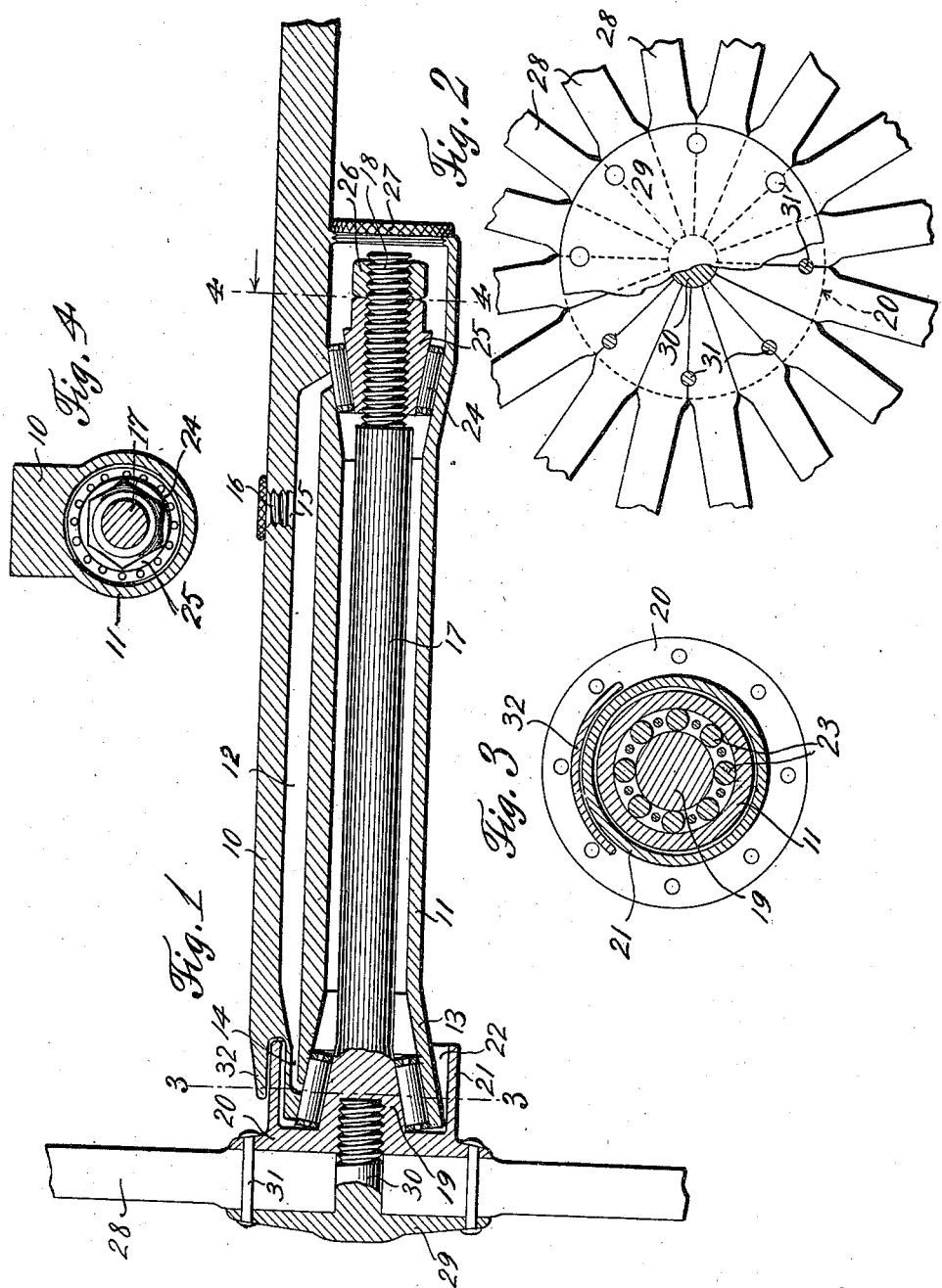

RUPERT L. HARRELL, OF NORTHWILKESBORO, NORTH CAROLINA, ASSIGNOR OF ONE-HALF TO THE RED TOP BOTTLING COMPANY, OF NORTHWILKESBORO, NORTH CAROLINA.

VEHICLE-WHEEL HUB.

974,662.  Specification of Letters Patent.  Patented Nov. 1, 1910.

Application filed March 12, 1910. Serial No. 548,865.

*To all whom it may concern:*

Be it known that I, RUPERT L. HARRELL, a citizen of the United States, residing at Northwilkesboro, in the county of Wilkes and State of North Carolina, have invented certain new and useful Improvements in Vehicle-Wheel Hubs, of which the following is a specification.

This invention relates to wheels for vehicles and is designed to construct a durable, simple and inexpensive wheel wherein oil is conducted to both bearings of the spindle.

With the above and other objects in view, this invention consists of the construction, combination and arrangement of parts all as hereinafter more fully described, claimed and illustrated in the accompanying drawings, wherein:

Figure 1 is a central longitudinal section of a wheel constructed in accordance with the present invention; Fig. 2 is a side elevation thereof, parts being broken away; Fig. 3 is a section taken along line 3—3 of Fig. 1; Fig. 4 is a section taken along line 4—4 of Fig. 1.

Reference being had to the drawings, 10 indicates the axle of a vehicle provided at each extremity thereof with a tubular boxing 11, said boxing being open at both extremities and resting normally below the axle. A longitudinal channel or bore 12 is formed in the axle above said boxing and opens into the same adjacent each extremity. The boxing is provided with the flared portions 13 and 13' at each extremity thereof, said flared portions being pierced centrally by the connecting duct 14 between the passage or bore 12 and the boxing. In order to provide a means whereby oil may be inserted into the bore or passage 12, an opening 15 is provided through the axle in which is threaded the cap or closure 16. A spindle 17 is mounted in the boxing 11, said spindle having its inner terminal 18 threaded and its forward terminal enlarged to form the conical portion 19, said conical portion being adapted to rest substantially parallel to the flared portion 13 of the boxing. A circular plate 20 is formed at the outer terminal of said spindle on which is cast or similarly shaped an inwardly extending flange 21, said flange forming in combination with the conical portion 19 of the spindle a cup 22.

A roller bearing 23 is interposed between the conical enlargement 19 of the spindle and the flared portion 13 of the boxing and is so located that the duct 14 leading from the passage 12 is so situated that oil is disbursed centrally about said bearing. A similar bearing 24 is mounted on the threaded portion of the spindle adjacent the flared portion 13' and is likewise so situated with respect to the duct 14 that oil is circulated freely about said bearing.

In order to provide a means whereby the roller bearing is retained firmly in place and that the spindle is unable to work itself free from the boxing, a wedge nut 25 fits in said bearing 24 and is retained in any desired position by the locking nut 26. A dust cap 27 is threaded at the rear terminal of the boxing 11 and consequently facilitates the access to the bearing and nuts.

A plurality of spokes 28 are secured to the plate 20 by the clamping plate 29, said clamping plate being provided with a threaded stud or shank 30 which is engaged by a threaded centrally disposed orifice located in the forward terminal of the spindle 17. A plurality of rivets 31 pierce the clamping plate 29 and the plate 20, thus firmly holding the spokes therebetween.

In order that dust or dirt may be prevented from working into the outer bearing and that the grease may be retained therein, a projection or lip 32 is superposed above the flange 21 and is formed on the axle 10, thus forming a cap or covering for the joint between said flange and the boxing.

Having thus described my invention, what is claimed as new is:

In a device of the class described, the combination with an axle, of a wheel coöperating therewith, a spindle carried by said wheel provided with a conical formed bearing adjacent to said wheel said bearing being surrounded by a horizontal, spaced flange, a tubular boxing carried below said axle provided with conical flared portions at each extremity thereof the outer flared portion being substantially parallel to the conical bearing of the spindle the flange surrounding said spindle being adapted to fit over the end of the tubular boxing, a tapered nut carried by the inner terminal of said spindle the sides of which being substantially parallel to the inner flared portion of said tubular boxing, roller bearings interposed between the conical bearing of said spindle, the nut carried by said spindle, and the flared portions at the ends of the tubular boxing, and an outwardly extending lip carried by the upper side of said axle projecting over the joint between the flange surrounding the spindle and the tubular boxing.

In testimony whereof I affix my signature in presence of two witnesses.

RUPERT L. HARRELL.

Witnesses:
J. I. MYERS,
W. A. BROWN.